March 28, 1933.   J. L. SNODGRASS   1,903,227
GREASE GUN
Filed Sept. 2, 1925   2 Sheets-Sheet 1

March 28, 1933.  J. L. SNODGRASS  1,903,227
GREASE GUN
Filed Sept. 2, 1925   2 Sheets-Sheet 2
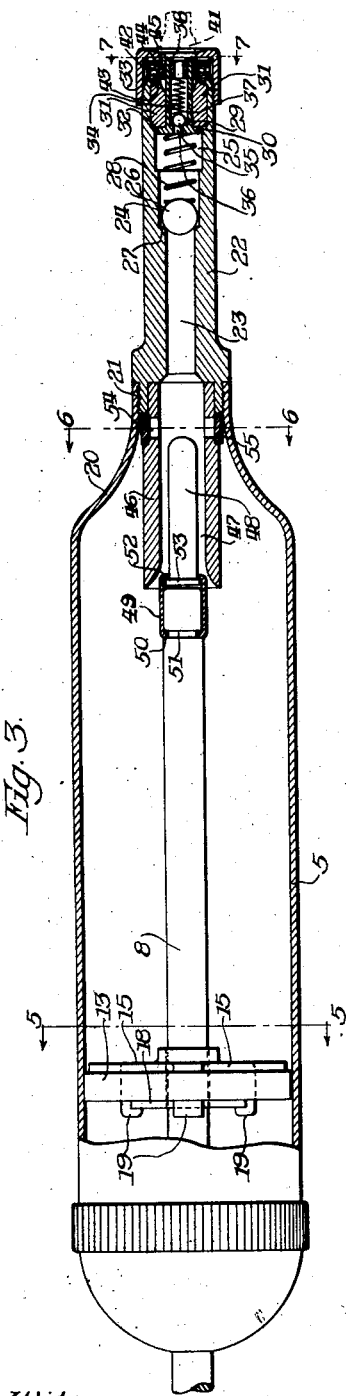
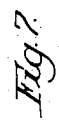
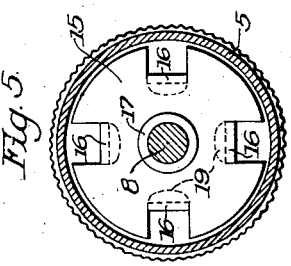
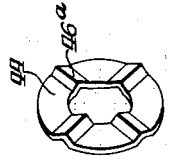
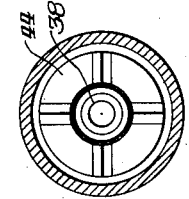
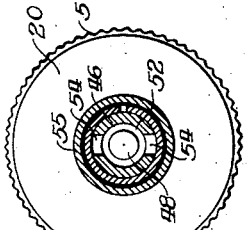
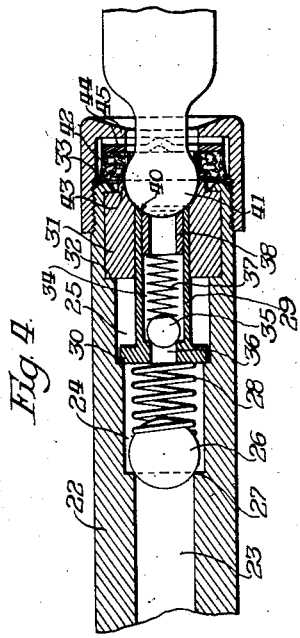
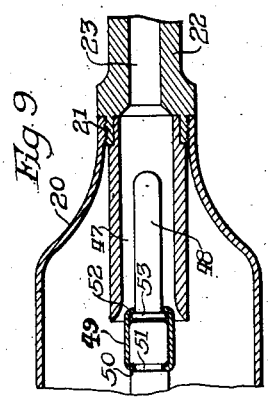

Patented Mar. 28, 1933

1,903,227

UNITED STATES PATENT OFFICE

JOHN LINCOLN SNODGRASS, OF CHICAGO, ILLINOIS, ASSIGNOR TO ALEMITE CORPORATION, OF CHICAGO, ILLINOIS, A CORPORATION OF DELAWARE

GREASE GUN

Application filed September 2, 1925. Serial No. 53,982.

This invention relates broadly to lubricating devices, and in particular to such devices as are commonly known as grease guns, and the invention finds particular utility in the dispensing, under high pressure, of relatively heavy lubricants, such as grease, especially where it is desired to introduce the lubricant into a relatively tight bearing or joint, where such joint or bearing has become rusted or incrusted with dirt or grit in use.

While the invention disclosed herein and in the accompanying drawings, includes a structure particularly adapted for handling relatively heavy grease for use in lubricating the chassis, joints, springs and the like of an automobile, it will be understood that the invention finds a wide field of utility for applying grease or other lubricants to other machinery.

Those skilled in the art will appreciate that in lubricating a chassis or motor vehicle, it is necessary that the numerous joints of the chassis, spring rigging and running gear be thoroughly lubricated, and owing to the fact that these parts are exposed to the weather and to dust, mud, and various deposits, it is necessary that in lubricating these parts, the metal to metal surfaces be thoroughly cleansed and that the old lubricant be forced out and replaced with fresh lubricant. This requires relatively high pressure, and numerous devices are patented and some are on the market today and in use for this purpose. These devices, to the best of my knowledge, are largely unsatisfactory, because they do not afford the high degree of pressure desired, and where this pressure is obtained, a suitable connection which will clean, wipe, and at the same time afford a tight and relatively readily disconnectible joint is lacking.

The principal objects of this invention are to provide a lubricating device capable of developing a relatively high degree of pressure, and which will upon each impulse, supply a full and complete increment of lubricant to a receptacle therefor; a device which serves to afford a connection between its outlet and the nipple or other connection on the receptacle to receive the lubricant, that is, joint or bearing, wherein such connection will first scavenge or flush the nipple or other connection to the joint or bearing, then as the lubricating device is further engaged with said nipple, wipe the same, so as to afford a true solid metal to metal joint between the lubricating device and the nipple, and thus prevent leakage when the high pressure is applied.

This invention is further characterized by a simplified structure, wherein the connecting part containing the scavenging device and wiper may be made by a single machine operation; the provision of an improved high pressure cylinder for receiving and discharging increments of lubricant; the provision of a priming device: the provision of an improved means for creating suction for causing the lubricant to pass from the containing chamber through the cylinder to completely fill the same for each suction motion; the provision of an improved arrangement of means in the lubricant containing supply chamber for causing the lubricant to be always present at the inlet to the pressure cylinder.

The invention is still further characterized by the provision of an improved connection between the lubricating device and a nipple or other element to receive the lubricant which has means which prevents a positive seal, and thus avoids destruction or damage to the wiper.

Other objects and advantages of this invention will appear or be specifically pointed out, as this description proceeds, reference being had to the accompanying drawings, in which:

Figure 3 is a view similar to Figure 2, showing the parts in another position, and additionally showing the connection with the nipple in its first stage;

Figure 4 is an enlarged sectional view of the lubricating device connection, illustrating the final stage of the connection just prior to the injection of lubricant;

Figures 5, 6 and 7 are transverse sectional views taken on the lines 5—5, 6—6 and 7—7 of Figure 3, looking in the direction indicated by the arrows;

Figure 1:
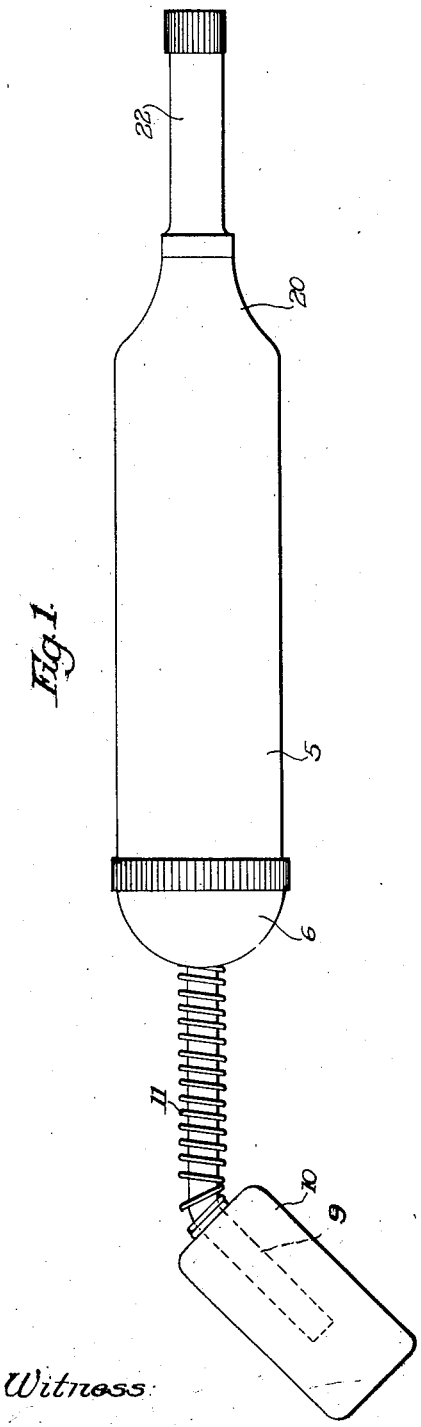
Figure 1 is a side elevation and view of the device of this invention.

Figure 8 is an enlarged perspective view of an improved washer;

Figure 9 is a longitudinal sectional view of a modified form of the priming device.

Referring more particularly to the drawings, it will be observed that the lubricating device includes a lubricant containing chamber 5, having the rear end thereof externally threaded to receive a substantially hemispherical closure 6, said closure being provided with an axial opening 7, to permit passage there-through of a plunger rod 8. The plunger rod extends through cap 6, and has its outer end bent at an angle, as indicated at 9, to receive a handle 10, a compression spring 11 being interposed between the handle and the cap 6.

Figure 2:
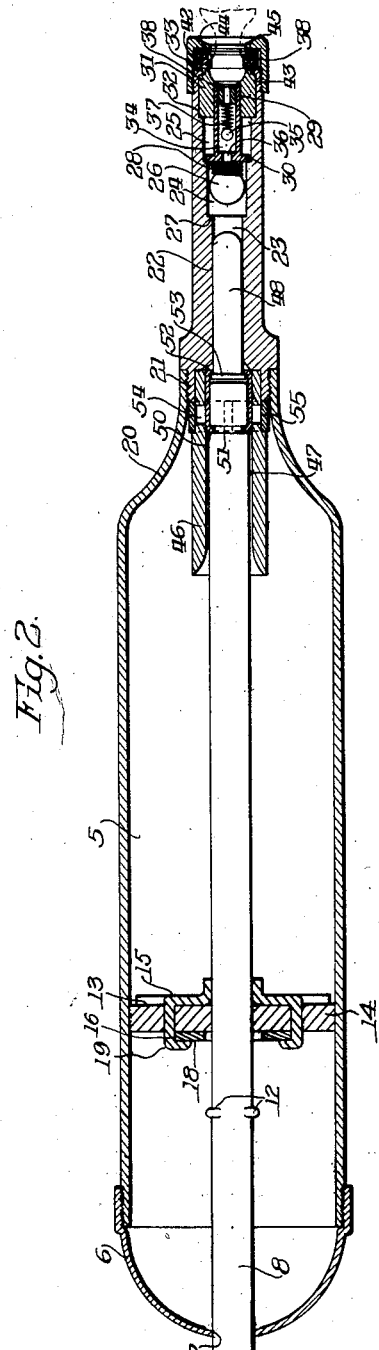
Figure 2 is a longitudinally sectional view of the device, showing outlet connection in normal position, and the piston contracted.

Outward movement of the plunger rod, under the action of the spring 11, is limited by the provision of the lugs 12, mounted on the rod within the container 5, said lugs abutting the cap 6, as seen in Figure 2.

The plunger rod extends into the chamber 5, and terminates adjacent to the opposite end thereof, a follower 13 being loosely mounted on said rod, and conveniently comprising a disc 14 of some soft material, such as leather or the like, this disc being snugly fitted within the chamber 5 and held for relative movement on the rod 8 and movement relatively thereto, and for movement relative to the chamber or casing 5, by the provision of the spider 15, having portions thereof cut away and passing through the disc 14, as indicated at 16—16, the spider having a hub 17, which fits the rod 8. To the rear of the follower 13 is applied a washer 18, and the portions 16 are bent into engagement with said washer. It will thus be seen that washer 18 and spider 15 reinforce the disc 14, and thus, at the same time, afford supporting and carrying means.

At the end of the casing or chamber 5, opposite to that at which the handle 10 is provided, said casing is reduced or tapered, as indicated at 20, and internally threaded to receive the annular portion 21 of the nozzle, generally designated 22, said nozzle including the portions to be hereinafter described.

The nozzle 22 is provided with a bore 23, hereinafter termed a cylinder, a bore 24, slightly larger in diameter than the bore 23, and hereinafter to be termed a check valve chamber, and a larger bore 25 for receiving a part of the flushing device hereinafter to be described.

The check valve chamber 24 contains a ball valve maintained on the seat 27 by the provision of a helical compression spring 28, which latter engages the ball 26 at one end, and at its other end abuts a slidable plunger 29, said plunger having an annular enlarged portion 30, which loosely fits within the bore 25. This loose fit is essential, as will hereinafter be pointed out.

The plunger 29 is slidably mounted in the bearing member 31, which latter is secured fixedly at the outer face against a shoulder 32, and by swedging over the outer edge of the nozzle, as indicated at 33.

The plunger 29 is hollow to provide a chamber 34 for receiving a secondary ball check valve being adapted 35, said valve to normally close a port 36 in the inner end of the plunger 29, a helical spring 37 acting to normally retain said ball 35 on its seat to close the port 36. In order to retain the spring 37 in position, and to afford an abutment therefor, a sleeve 38 is pressed or otherwise secured in the plunger 29 in the outer end.

From an inspection of Figures 2, 3 and 4, it will be observed that the outer circumferential edges of the plunger 29, sleeve 38 and bearing 31 are complementally milled or otherwise cut to form a substantially continuous convex surface 40, this surface being substantially hemispherical and corresponding in shape to the substantially spherical face of the nipple shown in Figures 2, 3 and 4. This nipple, as is conventional in the art, contains a bore, which is closed normally by a spring check valve, and any usual form may be employed, the essential point being that the surfaces 40 and 41 be shaped substantially as shown.

The plunger 29 performs the function of a flushing means, and will be so referred to in this specification, and in the claims.

Normally the flushing plunger 29 is in an outer position, such as shown in Figure 3, so that when the nipple engages said plunger, the latter will be moved rearwardly, that is, toward the cylinder 23, and an increment of lubricant contained in the bores 24, 25 and any contained in the plunger 29 will be caused to pass through the outer end of the plunger 29 over the surface of the nipple, and thus flush or wash it clean of grit, dirt or other foreign matter contained on its outer surface, and thus, when the lubricating device is pressed further onto the nipple, the plunger 29 retracts against the tension of the spring 28, until the peripheral edges of the bearing 31, sleeve 38 and plunger 29 are flush, so that a clean metal to metal contact is afforded between the surfaces 40 to 41.

As this step in the movement of the lubricating device takes place, the lubricant which was employed to flush the nipple, and which, of course, carries with it the grit or dirt, is wiped from the nipple by the provision of an annular washer 42, axially mounted over the outer end of the nozzle 22, and formed of some soft material, such as cork or the like.

The washer 42 is retained in position by abutment against the projecting peripheral portion 43 of the bearing 31, and in order to prevent a seal back of the washer and resultant damage to the washer, due to high pressure created when the lubricating device is withdrawn from the nipple, a metallic washer 44 is interposed between the outer flat surface of the cork washer 42 and the inner surface of the flange surface of the cap, said washer 44 having radial indentations 46*a*, according passageway for the lubricant around and in back of said washer 42.

It will be seen that should any lubricant leak back of the washer 42, it cannot be retained, and thus create a pressure on the washer when the nipple is withdrawn, for the reason that any such lubricant will pass through the radial passageways afforded by the metallic washer 44. The cap 45 threads onto the outer end of the nozzle 22, and may be readily removed for renewing the washer 42.

At the inner end of the cylinder 23, an auxiliary cylinder 46 may be provided as shown, that is, while the cylinder 46 and cylinder 23 may be made all in one piece, I have conveniently shown them in two separate parts.

The cylinder 46 is co-axial with the cylinder 23, but affords a chamber 47, slightly larger in diameter than that of the cylinder 23, and a piston comprising the portions 48 and 49 is adapted to reciprocate in said cylinders 23 and chamber 47, by the manipulation of the handle 10 and rod 8. It will be understood that when the piston 48 is in the position shown in Figure 3, it performs no function in the chamber 47, other than to reduce the cubical content of said chamber, so that substantially no differential effective pressure exists in the cylinder 23 and chamber 47 when the pistons are moved inwardly. For convenience in eliminating possibility of breakage or chipping of the pistons 48 and 49, they are flexibly connected, that is, the piston 49 is a cylindrical piece, having its rear edge bent to form a flange 50 engaged in a circumferential groove 51 in the rod 8, and the other end of said piston 49 being bent to form a flange 52, which engages a shoulder 53 formed on the piston 48, the piston 48 being spaced slightly from the end of the rod 8, and the piston 49 being relatively rotatable with respect to the rod and the piston 48, so that the piston 49 serves as a flexible connection between itself, piston 48 and rod 8.

To permit of escape of excess lubricant from the cylinder 47, and also to permit of entrance of a small part of the lubricant, I provide radial bleed openings 54 in the wall of the cylinder 46, and these openings are normally closed by a split resilient ring 55, lying in a groove provided therefor, which in the present instance, comprises an external shoulder on the cylinder 46 and the threaded part 21 of the nozzle 22.

In the operation of the device, as described, reference may be had, first, to Figure 3, wherein the parts are in the normal position. As the device is engaged with the nipple, the outer end of the plunger 29, by virtue of the concave surface provided thereon, engages the nipple, and the tensile strength of the spring 28 being relatively low, a slight pressure on the handle will retract the flushing plunger 29, thus causing the operation hereinbefore described. As the nipple passes into the seat provided therefor, the surface of the nipple is cleaned by the wiper 42.

The operator then imparts a rapid inward motion or series of such motions to the rod 8, which in turn causes the pistons 48 and 49 to reciprocate into and out of their respective cylinders. Assuming that no lubricant has as yet entered the cylinders 23 and 46, the first movement of the pistons into these cylinders will have no effect, except to exclude the air therefrom, but after the first movement, which is, of course, preferable to carry out before applying the gun, the pistons will be withdrawn by the action of the spring 11, which creates a subnormal pressure in the cylinders 23 and 46, and this subnormal pressure is broken at two points, namely, as soon as the piston 49 passes the ports 54, a slight passage of the lubricant at ring 55 will take place, and as soon as the piston 49 moves to the position shown in Figure 3, the suction created in the cylinders 23 and 46 is exerted on the lubricant contained in the casing or chamber 5, causing an increment thereof to substantially completely fill both of the cylinders. In the event that the suction thus developed is not sufficient to completely fill the cylinder 23, which is of such size as to contain a supply adequate for one "shot", the cylinder 23 will become filled by the movement of the piston 49 in the cylinder 46 forcing the lubricant out of this chamber into the cylinder 23, until the piston 48 enters said latter mentioned cylinder. Any superfluous lubricant then contained between the outer surface of the piston 48, piston 49 and wall of the cylinder 46, is allowed to escape past the ring 55 into the casing 5.

It will, of course, be understood that the lubricant contained in the cylinder 23 is simultaneously ejected therefrom, at high pressure, past the ball valve 26, ball valve 35, and into the nipple. I have been able to develop pressures as high as twenty-six hundred pounds and greater, and have found, after considerable experiment, this pressure is adequate. The pressure thus developed is, of course, dependent upon the degree of opposition offered by the bearing or joint to entrance of the lubricant.

The relative sizes of the cylinder 23 and chamber 47 of the cylinder 46 are such that the travel of piston 49 in cylinder 46 before the piston 48 enters the cylinder 23 displaces an amount of lubricant equal to the cubical content of the cylinder 23. Thus, in the event that the cylinder 23 is not completely filled by the action of suction, it will be filled by the movement of piston 49. Any excess lubricant in chamber 47 will thereupon escape through ports 54.

In Figure 9, the split ring 55 and ports 54 are eliminated, and entrance and exit to the cylinders is had past the piston 49, which is of slightly smaller diameter than that of cylinder 46. This arrangement will afford the necessary supply of lubricant to the cylinder 23, because when the suction created in this latter cylinder brings the lubricant into the chamber 47, the piston 49 passing into this chamber will force the lubricant along the path of least resistance into cylinder 23. A slight churning of the lubricant is caused by the movement of the piston 49, but this is not detrimental for the reason that it tends to break up large air pockets, which otherwise might affect the operation of the device.

Having thus described my invention and illustrated its use, what I claim as new and desire to secure by Letters Patent is:

1. In a lubricating device, in combination, a chamber for containing a lubricant, a cylinder communicating with said chamber having two portions of different diameters, and an outlet from one of said portions, and flexibly connected pistons operable in said cylinder portions.

2. In a lubricating device, in combination, a chamber for containing a lubricant, a cylinder comprising two axially connected portions of different diameters and communicating with said chamber, concentric pistons operable in said cylinder portions, and a bleed from one of said cylinder portions into said chamber, an outlet connection from said cylinder for connecting the device to a nipple, and flushing and wiping means for the nipple carried by said connection.

3. In a device of the character described, in combination, a chamber having a high pressure cylinder, an auxiliary cylinder of different diameters between said chamber and said high pressure cylinder concentric therewith, and in communication with both, a check valve between said auxiliary cylinder and said chamber, a pair of concentric pistons complemental each to said cylinders, respectively, a plunger rod for jointly operating said pistons, and a follower in said chamber and carried by said plunger rod.

4. In a device of the character described, a cylinder having an outlet, a plunger operable in said cylinder, a plunger rod capable of displacement out of axial alinement with the cylinder, an auxiliary cylinder, having an outlet and axially alined with the first mentioned cylinder and in free communication therewith through the inlet to said first mentioned cylinder, and a piston for said auxiliary cylinder and supported at the outer end of said plunger.

5. In a device of the character described, a cylinder having an inlet, a plunger operable in said cylinder, a plunger rod capable of displacement out of axial alinement with the cylinder, an auxiliary cylinder, having an outlet and axially alined with the first mentioned cylinder and in free communication therewith, and a piston for said auxiliary cylinder, said piston serving as a flexible connection between said plunger and plunger rod.

6. In a device of the character described, a cylinder having an inlet, a plunger operable in said cylinder, a plunger rod capable of displacement out of axial alinement with the cylinder, an auxiliary cylinder, having an outlet and axially alined with the first mentioned cylinder and in free communication therewith, and a piston for said auxiliary cylinder, said piston being flexibly connected to both said plunger rod and plunger to facilitate entrance of the latter into its cylinder.

7. In a device of the character described, a cylinder having an outlet, a plunger operable in said cylinder, a plunger rod capable of displacement out of axial alinement with the cylinder, an auxiliary cylinder, axially alined with the first mentioned cylinder, a chamber for containing material to be introduced into said cylinders, a follower in said chamber carried by said plunger rod, and a piston for said auxiliary cylinder and supported at the outer end of said plunger.

8. A lubricating device including a chamber for containing a lubricant, a high pressure cylinder communicating with said chamber, an auxiliary cylinder of different diameter communicating and in axial alinement with said chamber and said high pressure cylinder, and concentric pistons operable in both of said cylinders and a discharge conduit leading from said high pressure cylinder.

9. A lubricating device including a chamber for containing a lubricant, a high pressure cylinder communicating with said chamber and having a piston, an auxiliary cylinder communicating with said chamber and said high pressure cylinder, and flexibly connected pistons operable in both of said cylinders and a discharge conduit leading from said high pressure cylinder.

10. A grease gun having a discharge nozzle provided with a recess to receive a nipple, and means on said grease gun operable during the connecting of the nipple thereto for flushing said nipple prior to the perfection of the seal between said nipple and said gun.

11. A grease gun having a discharge nozzle provided with a recess to receive a nipple, and means in said recess operable during the connecting of the nipple thereto for flushing and scavenging the same prior to the perfection of the seal of said nipple within said recess.

12. A grease gun having a discharge nozzle provided with a recess to receive a nipple, and means in said recess for preliminarily discharging grease for scavenging said nipple during the connecting of the gun thereto.

13. A grease gun including a cylinder and plunger, means for connecting the grease gun to a nipple, and means operated by connection thereof to the nipple for flushing the nipple upon connection of the gun thereto, said flushing means serving to conduct material contained in the gun to said nipple upon operation of said plunger in one direction.

14. In a grease gun, the combination of a cylinder and a plunger operable therein, means for connecting the grease gun to a nipple, and said means being actuated by the nipple for flushing the latter by the engagement of the nipple therewith.

15. In a grease gun, the combination of a cylinder and a plunger operable therein, means for connecting the grease gun to a nipple, and said means being actuated and operating for flushing the nipple by the engagement of the nipple therewith, said flushing means including a reciprocable auxiliary plunger co-operating with said nipple for conducting material from the gun to the nipple when said auxiliary plunger is actuated in one direction.

16. A grease gun including a cylinder and plunger operable therein, means for connecting said cylinder to a nipple including a discharge nozzle, means for flushing said nipple upon connection to the gun, and means for wiping said nipple.

17. In a portable hand operated grease gun, the combination of a grease barrel, a cylinder concentric therewith and having two portions of different diameters, an outlet from one of said portions and a bleed between the other of said portions and said barrel, an axially disposed rod in said barrel provided with pistons cooperable with said cylinder portions, and manipulative means for axially moving said rod relative to said barrel for effecting the reciprocation of said pistons in said cylinder portions.

18. In a portable hand operated grease gun, the combination of a cylindrical grease reservoir, a concentric cylinder disposed at one end of said reservoir and having two axially connected portions, an outlet from one of said portions and a valve controlled bleed from the other of said portions into said reservoir, a rod disposed axially of said reservoir and provided with concentric pistons at one end thereof, and a handle on the opposite end of said rod for axially moving the same thereby to reciprocate said pistons in said cylinder portions.

19. In a portable hand operated grease dispensing gun of the contact type, the combination of a cylindrical grease chamber having a discharge nozzle arranged to make sealing contact with a lubricant receiving fitting by a thrust movement of the gun, a cylinder concentrically disposed at one end of said chamber comprising two axially connected portions, an axially disposed rod in said chamber provided with a handle at one end and a pair of pistons at the other end thereof, a bleed from one of said cylinder portions into said chamber, and an outlet from the other of said cylinder portions through said discharge nozzle, said rod being adapted to reciprocate said pistons in said cylinder portions upon a thrust movement of the handle when said nozzle is in engagement with a lubricant receiving fitting.

20. In a portable hand operated grease dispensing gun of the contact type, the combination of a cylindrical grease chamber, a cylinder concentric therewith and disposed at one end thereof, a rod extending axially through said chamber having a handle at one end thereof and a plunger at the other end thereof operable in said cylinder, means for connecting said cylinder to a lubricant receiving fitting, an auxiliary compartment in open communication with said cylinder and said chamber, and means associated therewith carried by said rod for introducing lubricant into said compartment for maintaining a constant supply in said cylinder, said rod being axially movable in said chamber, when said cylinder is in communication with a lubricant receiving fitting, by a thrust movement upon said handle for effecting the reciprocation of said plunger in said cylinder.

21. In a portable hand operated grease dispensing gun of the contact type, the combination of a lubricant reservoir, a high pressure cylinder in communication with said reservoir and having a piston operable therein, an auxiliary cylinder communicating with said chamber and said high pressure cylinder, and pistons simultaneously operable in both of said cylinders upon the application of the gun by a thrust movement to a lubricant receiving fitting.

22. In a hand operated portable grease gun adapted to discharge grease under pressure, a body member having a discharge outlet, a grease chamber fixed to said body member, a plunger mounted for reciprocation within said member and comprising a low pressure piston adapted to effect a discharge of grease from said chamber through said outlet only at the beginning of the discharge stroke of said plunger, a high pressure piston loosely connected to said low pressure piston adapted to effect a discharge of grease through the same outlet under a relatively high pressure only immediately prior to the completion of the discharge stroke of the plunger, and means for automatically rendering said low pressure piston ineffective to discharge grease when the discharge pressure reaches a predetermined value.

23. In a grease gun adapted to discharge grease under high and low pressure, a pressure chamber in said gun comprising a high pressure cylinder and a low pressure cylinder, and a plunger operable in said cylinders comprising a high pressure piston and a low pressure piston, said high pressure piston being loosely secured to said low pressure piston and mounted concentrically therewith.

24. In a device of the class described the combination of a reservoir, a cylinder and piston for dispensing grease therefrom, and a bleed between said cylinder and said reservoir, said bleed comprising a port in the wall of said reservoir and a split resilient ring engaging the outer wall of said cylinder for closing said port.

25. In a grease gun adapted to discharge grease under high and low pressure, a pressure chamber in said gun comprising a high pressure cylinder and a low pressure cylinder, pistons operable in said cylinders and a rod connecting said pistons with a source of power, said pistons comprising a plunger disposed at the end of said rod and operable in said high pressure cylinder and a sleeve connecting said plunger to said rod and operable as a piston in said low pressure cylinder.

In testimony whereof I have hereunto signed my name.

JOHN LINCOLN SNODGRASS.